Figure 1:
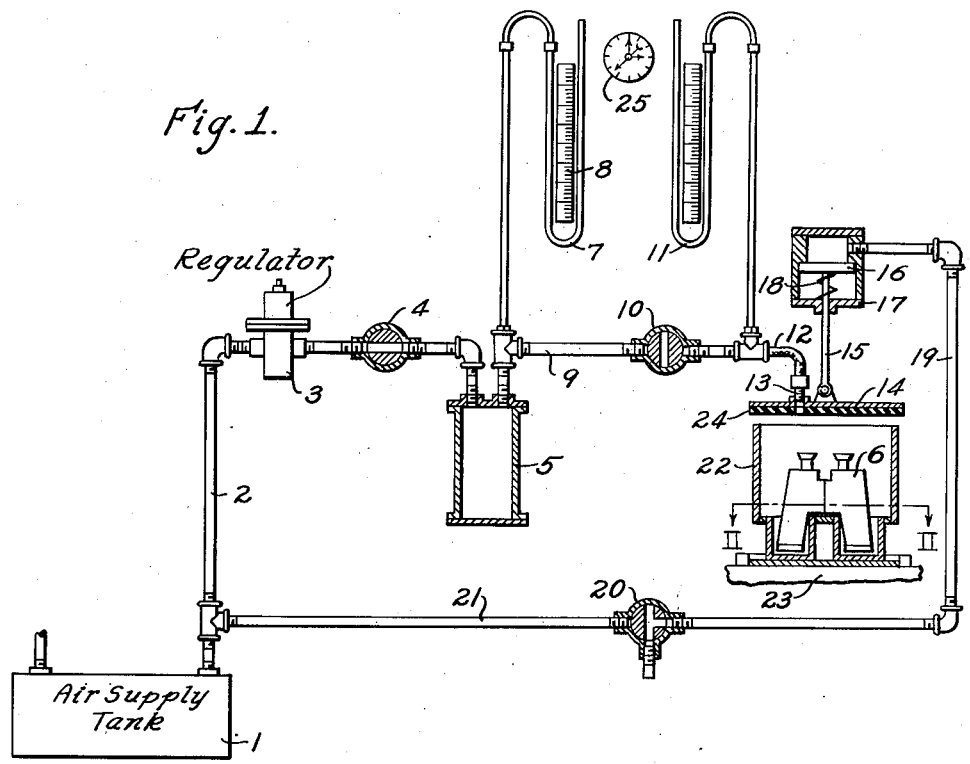

April 19, 1949.    C. S. MERTLER    2,467,767
LEAKAGE TESTING SYSTEM
Filed April 21, 1945

WITNESSES:
James F. Young

INVENTOR
Charles S. Mertler.
BY
Paul E. Friedemann
ATTORNEY

Patented Apr. 19, 1949

2,467,767

UNITED STATES PATENT OFFICE 2,467,767

LEAKAGE TESTING SYSTEM

Charles S. Mertler, Mansfield, Ohio, assignor to Westinghouse Electric Corporation, East Pittsburgh, Pa., a corporation of Pennsylvania Application April 21, 1945, Serial No. 589,653

3 Claims. (Cl. 73—40)

My invention relates to improved methods and apparatus for testing, normally hermetically sealed containers, for leaks and more particularly improved apparatus and methods of testing optical instruments for waterproofing.

The testing of binoculars and other optical instruments for waterproofing as practiced heretofore has been an operation shrouded with uncertainty, ineffectiveness and unreliability largely by reason of the methods employed.

All leak testing of optical instruments to determine if the construction is waterproof as heretofore used is by actually subjecting each instrument, after it is finished, to either an artificial rain test or by immersing the instrument in a water bath.

The difficulty resulting from the above outlined methods of testing is that the instrument will almost invariably be accepted as a waterproof instrument except when the instrument has a rather prominent leak so that the tester can actually see that a substantial quantity of water has entered the instrument. The entry of a minute amount of moisture into the instrument cannot be detected by the rain test method nor the bath test method.

Further, if a small amount of water gets trapped in the threads or joints of the instrument and there is the minutest leak at these points, this trapped water eventually finds its way into the instrument. The presence of even a very minute amount of moisture in the optical instrument is by far the major cause for rendering the instrument unserviceable in the field. Moisture in an optical system causes what is known as a "foggy system" due to the condensations that occur on one or more of the optical elements. A "foggy system" in itself is bad enough, but the major trouble caused by the moisture in the system is that its presence promotes the growth of fungus. This fungus growth is particularly prevalent in tropical climates where very often an apparently perfect telescope, binocular, or other normally sealed optical instrument, becomes unusable after but a few weeks of exposure to the tropical climate.

One object of my invention is the provision of a method of testing, a normally sealed chamber, against leaks without the use of liquids.

Another object of my invention is the provision for expeditiously and unerringly detecting even very minute leaks, in a normally sealed chamber, without the use of water or other liquids.

A more specific object of my invention is the provisions of means for testing, normally sealed optical systems for leaks into the chamber housing the system.

Figure 2:
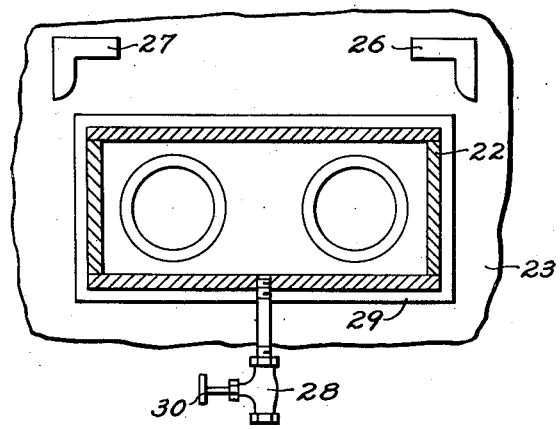

The objects stated are merely representative of many other objects and advantages that will become readily apparent from a study of the following specification and the drawing accompanying the specification, in which drawings:

Figure 1 is a somewhat schematic showing of apparatus for testing binoculars for leaks; and Fig. 2 is a sectional view on line II—II of Fig. 1 looking in the direction of the arrows at the ends of the line.

My novel method for testing sealed chambers for leaks is, as broadly stated, based on the volumetric displacement of a dry gas, as air, and thus does in no way require the use of any liquid.

In Fig. 1, I show a suitable supply tank or flask 1 containing a suitable gas, as air, under relatively high pressure. This tank 1 is connected by a suitable conduit 2 through a pressure regulator 3 and stop cock, or similar valve, 4 to the standard chamber 5. This standard chamber is so selected that it has an inside volume equal to the total volume of the can or chamber that is to be tested for leaks. The inside volume of chamber 5 may, of course, be different than here stated but to reduce the apparatus used and the method I employ to its simplest aspects I make the internal volume of chamber 5, for the particular application I have made of my apparatus and my method and which apparatus and method I herein disclose, equal to the total volume of the binocular 6.

To chamber 5 I directly connect a suitable pressure gage as the manometer 7 shown. This manometer has a suitable scale 8 disposed adjacent the legs of the manometer so that the pressure in the chamber may be determined from the difference of the liquid columns in the manometer legs.

The chamber 5 is also connected through conduit 9 and the cock valve 10 to a second pressure gage, as the manometer 11, similar in structure and function to the manometer 7.

The manometer 11 is connected, by means of a flexible rubber, or neoprene, hose 12 of suitable length and by means of a suitable nipple 13, so as to be open to the region below the gasketed lid 14. This lid 14 is mechanically coupled to the connecting rod of the piston 16 disposed in the cylinder 17. A suitable spring 18 normally biases the piston upwardly against an internal shoulder in cylinder 17.

By a coupling to the cylinder above the piston the cylinder 17 is connected, as shown, by conduit 19, through the two-way valve 20 and conduit 21 to the gas supply tank 1. By turning the valve 20 counterclockwise through a right angle, air is admitted to the top of cylinder 17 to thus activate the piston 16 downwardly against the action of spring 18. As the piston 16 is moved down, the lid 14 is moved to close the chamber 22.

The chamber 22 is provided with a combined handle-valve means 28 and is slidably disposed on the table, or base, 23 provided with suitable positioning stops 26 and 27 so that the chamber will be directly below the lid, or cover 14, when a binocular 6 is to be tested for leaks. The cover 14 has a suitable gasket 24 at its bottom surface so that chamber 22 is hermetically sealed when the cover is forced down and firmly held on chamber 22 by the pressure in the upper region of cylinder 17.

The handle 28 for shifting the chamber 22 is provided with an exhaust cock 30. In the operation of my apparatus the exhaust cock 30 is moved to open position before the lid 14 is lowered and is then closed. This operation is essential since the resiliency of the system, particularly the gasket 24 on the lid 14 if chamber 22 were closed would permit pressure to be built up in the chamber 22 and thus impair the accuracy of the test operation.

The chamber 22 is designed of sufficient depth, as shown, to receive the optical instrument so that the optical elements are not injured during the testing operation. Further, the chamber is designed to have an internal volume preferably exactly twice the total volume of the binocular 6. In other words, when the binocular 6 is in the chamber 22 and the cover 14, in conjunction with the gasket 24, seals the chamber 22, then the volume of the space in chamber 22 about the binocular 6 is equal to the internal volume of chamber 5.

The test operation is as follows, assuming valve 4 is closed (not as shown) and the other valve elements of my apparatus are in the position shown and exhaust cock 30 is open:

The operator first places a binocular in the chamber 22, and then by means of handle 28 places the base 29 of the chamber 22 in position against the stops 26 and 27 so that the chamber is under the cover 14 and then the operator turns the valve 20 counterclockwise through an angle of 90° to thus admit air under pressure to the top of cylinder 17. The piston 16 through connecting rod 15 firmly places the cover 14 on the chamber 22 to provide a hermetical seal between the top edge of chamber 22 and the gasket 24 while the binocular is in place in the position shown. The operator then closes exhaust cock 30. By having cock 30 open while the lid and its resilient gasket are seated no spurious pressure can be built up in chamber 22. By the use of the exhaust cock 30 in the open position when the gasket 24 is firmly seated absolute accuracy is obtained in the test operation since the pressure in the chamber is at atmospheric pressure and no higher.

The operator then opens valve 4, turning it to the position shown, to thus fill chamber 5 with air, at the same time taking note that the air in chamber 5, as indicated by the relative disposition of the liquid columns in the legs of the manometer 7 with reference to the scale 8 is at a given value, say ten pounds per square inch above atmospheric pressure, before he closes the valve 4. When the pressure is at the desired value, valve 4 is closed.

Now the operator opens valve 10 to connect the chambers 5 and 22 to each other and both of them to the two manometers 7 and 11. The liquid columns in the manometers will oscillate for a brief period. As soon as the oscillations have ceased thereby indicating stable pressure equalization, and the manometers indicate the same pressure, the attendant closes valve 10 to isolate chamber 22 from chamber 5.

If there is no leak in the binocular, both gages will at the moment of stable pressure equalization indicate the same pressure which will be half the pressure indicated by manometer 7 just before valve 10 was opened. Furthermore, if there is no leak in the binocular, this half value of pressure indicated by manometer 11 and comprising the stable equalization pressure will continue to be indicated by manometer 11 even after valve 10 is closed.

If there is a very large leak in the binocular so that the internal volume of the binocular enters into the pressure equalization, then both manometers will at the moment of stable pressure equalization immediately indicate the same pressure but now the pressure actually indicated by the manometers will not be half of the pressure indicated by manometer 7 just before valve 10 was opened but the pressure indicated by both manometers will now be considerably lower than half that value. By noting the values of the equalization pressures indicated by the manometer readings, the tester can thus immediately tell if a large leak is present.

To discover a slow leak, the tester merely notes the manometer reading of the manometer 11 immediately after valve 10 is closed. The observation period is from a half minute to a minute and a half, but preferably a minute. The time is determined by watching the second-hand on clock 25. If the pressure reading of manometer 11 decreases during the half minute or minute, constituting the "waiting period," there is a slow leak and the binocular must, therefore, be either returned to the production line for proper sealing or be discarded.

There are two distinct and useful results that flow from the isolation of chamber 5 from chamber 22 by the closing of valve 10 immediately after stable pressure equalization has taken place. First, during the "waiting period" the volume of air available to leak into the binocular is only half as much as would be the case if chamber 5 remained connected to chamber 22. This means that the pressure drop on manometer 11, for any given rate of leak of air into the binocular will be much greater during the "waiting period." This makes detection of small leaks easier and more expeditious. Second, during the "waiting period" the attendant again opens valve 4 to thus charge chamber 5 with air under a given pressure. No time is thus lost during the one minute "waiting period" but the instant the "waiting period" is over and the tested binocular removed, a second binocular can be placed in chamber 22.

If only a relatively small leak is present, the pressure gage 11 will unfailingly indicate such leak. Furthermore, a comparatively unskilled operator can nevertheless tell the size of the leak by the rate the pressure drops during the one minute test period.

After the test period is over, the exhaust cock 30 is opened and immediately thereafter the valve 20 is moved to the position shown to thus exhaust the air from the cylinder 17. The chamber 22 is moved from under the cover 14 and the binocular 6 is now removed from chamber 22. A second unit may now be tested repeating the steps recited, except, as pointed out, that step one is done during the "waiting period," when large numbers of binoculars are, as is usually the case, being tested in succession.

While I have shown but one embodiment of my invention, it is apparent my method is not limited to the particular apparatus shown nor limited to apparatus involving chambers having the relative volumes mentioned.

The test equipment itself can be very readily tested for leaks due to defective joints or gasket seals by subjecting chamber 22, while empty, to say five pounds per square inch pressure as indicated by manometer 11. Then by closing the valve 10, note the pressure readings. If the pressure readings remain fixed, there is no leak present. A similar procedure may be followed for chamber 5.

To recapitulate the advantages of my method and apparatus, it will be apparent I obtain (1) greater sensitivity which makes possible the immediate detection of minute leaks; (2) eliminate the possibility of minute quantities of moisture from getting into the optical instrument; (3) eliminate water stains on optics and the optic coatings; (4) prevent unjust criticism against the makers of optical instruments for letting instruments get into the field of use with "foggy optic systems"; (5) provide a more effective, a more rapid and a more reliable test; (6) lower the test cost at the maker's plant; (7) lower the instrument maintenance cost in the field; (8) estimate the actual size of the leak; (9) eliminate the costly and laborious operation of reworking an optical instrument which received water in its interior during a leak test; (10) helps produce an instrument of higher quality.

While I have shown only one embodiment, I do not wish to be limited to the particular showing made but wish to be limited only by the scope of the claims hereto attached.

I claim as my invention:

1. In an apparatus for testing a normally sealed can for leaks, in combination, a standard tank of a given volume, a pressure responsive gage operatively connected to the standard tank, gas supply means for supplying the standard tank with gas under pressure, means for controlling the supply of gas whereby a fixed amount of gas at a definite pressure may be placed in the standard tank, a test tank for receiving a can to be tested, means for hermetically closing the can receiving tank, a pressure responsive device operatively connected to the test tank, a conduit for interconnecting said tanks after the connection between the standard tank and the gas supply means has been closed, whereby said pressure responsive devices indicate the equalized pressure, thereby indicating if there is a substantial leak in the can tested, said interconnecting conduit between the test tank and standard tank having means for closing it immediately after the equalized pressure is noted, whereby the pressure responsive device connected to the test tank indicates by its variation, in case of a relatively small leak in the can, the rate of the leak.

2. In apparatus for testing a container for leaks, which container in its finished and usable form being hermetically sealed at atmospheric pressure so that the air pressure in the container is equal to the barometric pressure at the time the container is sealed, in combination, a standard hermetically sealed tank containing air under a given pressure greater than atmospheric pressure, a pressure gage connected to the standard tank to indicate the air pressure in the standard tank, a hermetically closed test tank housing said container, said test tank containing air at atmospheric pressure, a pressure gage connected to the test tank for indicating the pressure in the test tank, a conduit connecting the standard tank and test tank, valve means in said conduit which valve means in normal use are actuated from a closed position to a temporary open position back to closed position to thus temporarily place said tanks in fluid communication to equalize the air pressure in the tanks whereby said pressure gages, during the interim said tanks are in fluid communication will both indicate one known pressure if said container has no leak and another known lower pressure if the container has a large leak and whereby the changes in pressure indication of the gage connected to the test tank with reference to the pressure indication of the gage connected to the standard tank, after the tanks are no longer in fluid communication, is an indication of the leak rate of the container should it have a slow leak.

3. In apparatus for testing a container for leaks, the container to be tested for leaks in its finished and usable condition housing among other things, a fluid medium under a given pressure, in combination, a hermetically sealed standard tank having an internal volume substantially equal to the over-all volume of the container to be tested, said standard tank containing the same type of fluid medium disposed in the container but under a higher pressure than the pressure of the medium in the container, a pressure gage connected to the standard tank for indicating the fluid pressure in the standard tank, a hermetically sealed test tank having an internal volume substantially twice that of the standard tank housing said container and containing the same fluid medium as the container at substantially the same pressure as the fluid pressure in the container, a pressure gage connected to the test tank for indicating the pressure in the test tank, means for placing the test tank and standard tank in fluid communication to equalize the pressure in said tanks, whereby said pressure gages will indicate the same pressure which indication will be either equal to the pressure in the test tank prior to equalization plus one half the difference of the pressures in the two tanks before equalization, or equal to the pressure in the test tank prior to equalization plus one third the difference of the pressures before equalization depending on whether the container has no leak or a large leak and for slow leaks the pressure indication will change from the larger pressure to the lower pressure at a rate depending on the rate of the leak in the container.

CHARLES S. MERTLER.

REFERENCES CITED

The following references are of record in the file of this patent:

UNITED STATES PATENTS

| Number | Name | Date |
|---|---|---|
| 1,590,736 | Clark | June 29, 1926 |
| 1,720,934 | Toleik | July 16, 1929 |
| 1,900,918 | Dieter | Mar. 14, 1933 |

FOREIGN PATENTS

| Number | Country | Date |
|---|---|---|
| 121,620 | Great Britain | Dec. 10, 1918 |